United States Patent [19]

Hansen

[11] Patent Number: 5,045,785
[45] Date of Patent: Sep. 3, 1991

[54] LINEAR POSITION SENSOR WITH MOVABLE TAPERED ELEMENT

[75] Inventor: James A. Hansen, Morton Grove, Ill.

[73] Assignee: Borg-Warner Automotive, Inc., Sterling Heights, Mich.

[21] Appl. No.: 488,579

[22] Filed: Mar. 5, 1990

[51] Int. Cl.$^5$ .............................................. G01B 7/14
[52] U.S. Cl. .......................... 324/207.16; 324/207.24; 324/207.22
[58] Field of Search ....................... 324/207.16, 207.22, 324/207.24, 226, 234, 236, 262

[56] References Cited

U.S. PATENT DOCUMENTS

| | | | |
|---|---|---|---|
| 3,513,408 | 5/1970 | McGee | 324/207.16 X |
| 3,654,549 | 4/1972 | Maurer et al. | 324/207.24 X |
| 3,891,918 | 6/1975 | Ellis | 324/207.16 |
| 4,385,297 | 5/1983 | Schmitt et al. | 324/207.16 X |
| 4,502,006 | 2/1985 | Goodwin et al. | 324/207.16 |
| 4,788,526 | 11/1988 | Eckstein et al. | 324/207.16 X |
| 4,856,098 | 8/1989 | Morra | 324/207.16 |

FOREIGN PATENT DOCUMENTS 937992  6/1982  U.S.S.R. ........................ 324/207.16

*Primary Examiner*—Kenneth A. Wieder
*Assistant Examiner*—Warren S. Edmonds
*Attorney, Agent, or Firm*—Reising, Ethington, Barnard, Perry & Milton

[57] ABSTRACT

A linear sensor has a sealed inner housing and a slider located in telescoping relationship. The inner housing has a doughnut shaped coil at one end thereof. The slider has a sensor element/metallic core of varying cross-section and a slide bearing section. The slide bearing section guides the sensor element with respect to the coil so as to vary eddy currents therein to produce an output signal from the coil which varies linearly in accordance with the relative position of the sensor element and the coil. In a preferred embodiment, the slide bearing section is supportingly received by the inner housing. A rigid outer housing has a fixed sealed end connected to the inner housing. A free end on the rigid outer housing is slideably, sealingly engaged with the outer surface of the slider so as to seal the interior of the linear sensor. The outer housing is thereby operative to both seal the interior of the linear sensor and laterally reinforce the linear sensor as it is moved between extended and retracted positions.

15 Claims, 3 Drawing Sheets

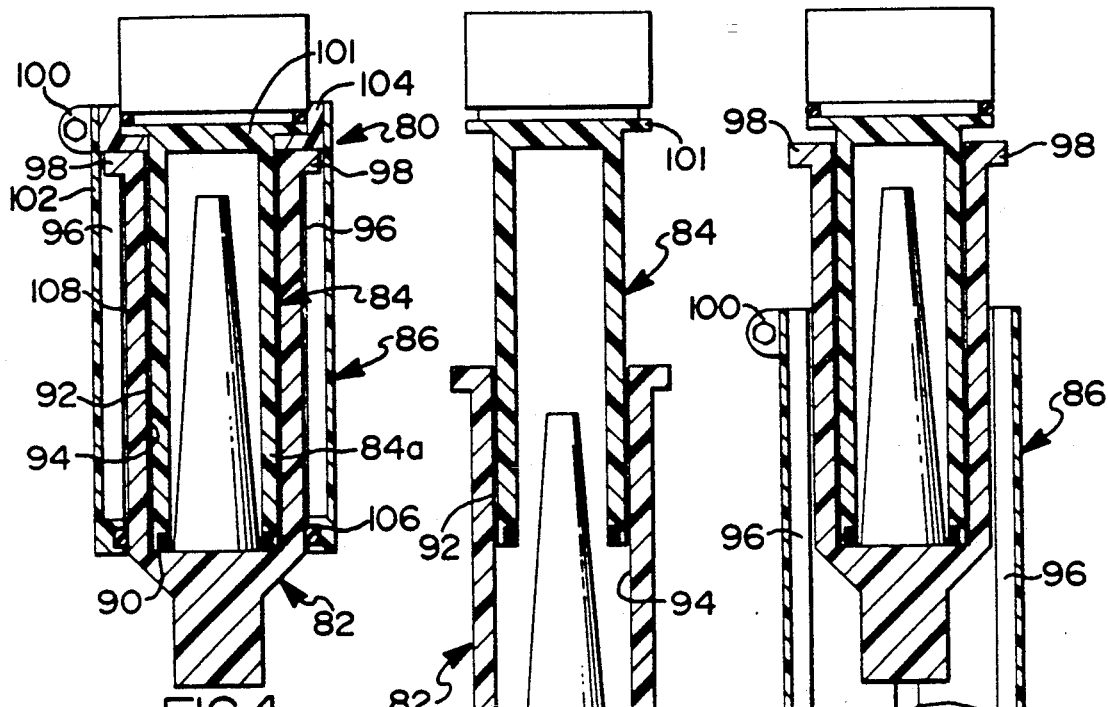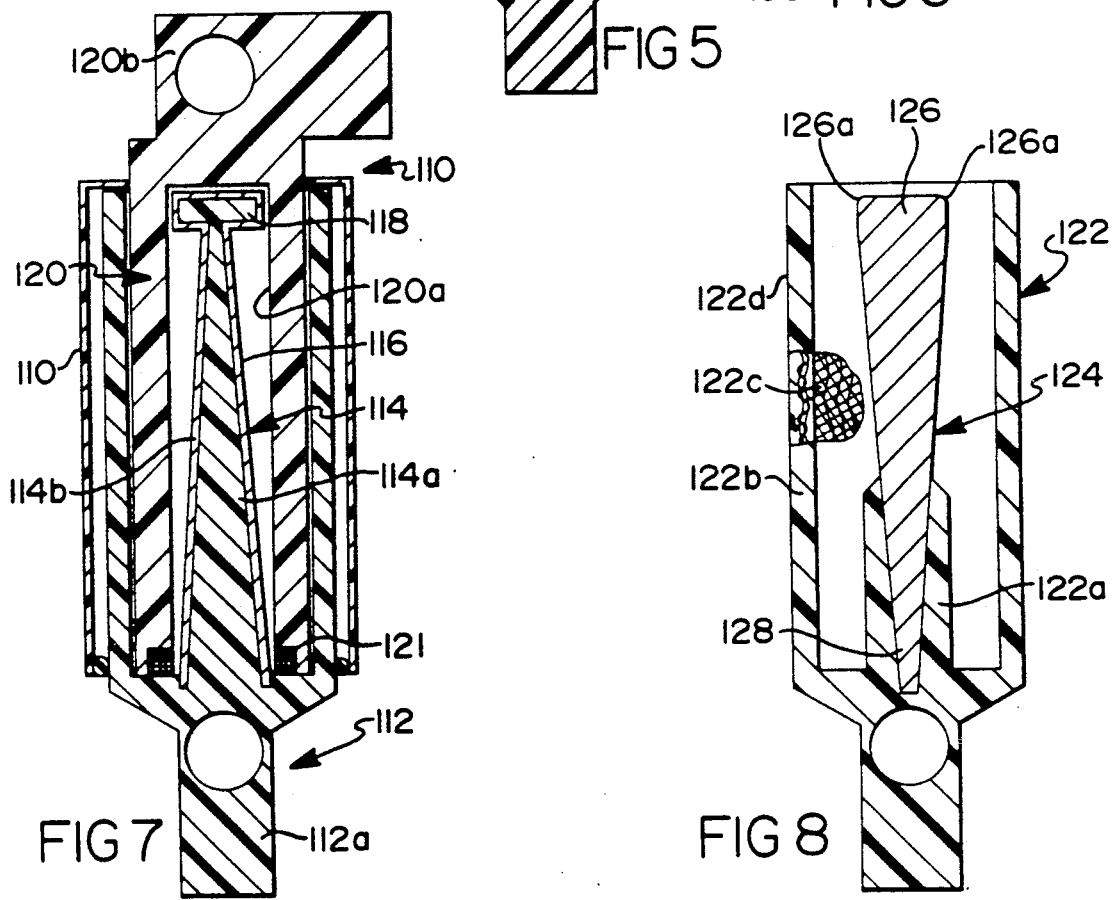

LINEAR POSITION SENSOR WITH MOVABLE TAPERED ELEMENT

FIELD OF THE INVENTION

This invention relates to sensor assemblies, and more particularly, to linear sensors having first and second relatively movable members adapted to be connected between sprung and unsprung mass portions of a vehicle to sense the height relationship therebetween.

Various linear sensor assemblies are known, which utilize the eddy current principle to produce an output signal in accordance with movement of a core element with respect to a coil. Examples of such linear sensors are shown in U.S. Pat. Nos. 3,546,648; 4,282,485; and U.K. Patent 2,115,929B. In specific applications, such linear sensors operate in exposed environments, for example, at a location between the sprung and unsprung mass of a vehicle suspension system. A resilient protective boot or bellows encloses the relatively moving components of the linear sensor to seal its interior so as to protect it against dirt, moisture and the like.

One problem with such arrangements is how to provide lateral support as the relatively movable components of the linear sensor are stroked between fully extended and fully retracted positions. Yet another problem with such linear sensor arrangements is how to wind the coil configuration such that the sensor element or metallic core will produce changes in eddy currents in the coil to produce a resultant linear output signal therefrom. In other cases, dirt entry problems can arise if the thin flexible wall of the boot or bellows is perforated.

SUMMARY OF THE INVENTION

One feature of the present invention is to provide a linear sensor having a ring or doughnut shaped sensing coil supported on one of a pair of relatively moving members wherein the other of the relatively moving members carries a sensor element in the shape of a tapered member having a fixed end and a free end movable with respect to the sensing coil to produce a maximum output signal when the free end of the sensor element is located in proximity to the sensing coil and to produce a minimum output signal when the fixed end is aligned with the sensing coil.

Another feature of the present invention is to provide such a linear sensor wherein the first and second relatively movable members are telescopingly connected and one of the members has a free end with an annular groove which supports the coil.

Still another object of the present invention is to provide such an arrangement where the first and second relatively movable members are telescoped together to define a sliding bearing surface for supporting relative movement therebetween as the sensor members are moved between their fully extended and fully retracted (compressed) positions.

Yet another object of the present invention is to provide a linear sensor of low cost and one which is easy to assemble by the provision therein of a first movable sensor member having an end thereof carrying a doughnut shaped coil and wherein the other of the relatively movable members of the linear sensor has a sensor element secured thereto located coaxially of the supported coil and movable with respect thereto to vary the output signal of the linear sensor in accordance with the shape of the outer surface of the sensor element.

Still another object of the present invention is to provide a linear sensor in which one of the relatively movable first and second members includes a housing which contains the control circuit and sensing coil components in a unitized package.

Still another object of the present invention is to provide such an arrangement wherein the sensing coil is supported only at the free end of one of the members and has the eddy current patterns therein varied by movement of a sensor element having a free end and a fixed portion.

Yet another object of the present invention is to provide means on each of the first and second members to space the sliding bearing support outboard of the coil for supporting relative movement between the first and second relatively movable members such that the sensing area between the sensor element and the coil is located in direct proximity so as to allow for maximum signal strength.

Yet another object of the present invention is to provide an outer housing on a linear sensor which will provide a rigid lateral support housing that will seal the interior of the linear sensor during movement thereof between fully retracted and extended positions.

Yet another object of the present invention is to provide a linear sensor of the type set forth in the preceding objects and features wherein the sensor element has either a plastic core with a metal cover or has a metal core with a plastic cover.

Yet another object of the present invention is to provide an improved method for assembling a linear sensor having first and second movable parts by providing a pair of oppositely facing hollow members; locating the hollow members in sliding relationship to define a sliding bearing surface therebetween; sliding a rigid outer housing over one of the first and second members; providing a sliding seal between one end of the outer rigid housing and one of the hollow members and fixedly and sealingly connecting the opposite end thereof to the other of the members to provide a sealed enclosure for movement of a coil and sensor element relative to one another upon reciprocation of the first and second members between fully extended and fully retracted positions.

BRIEF DESCRIPTION OF THE DRAWINGS

Various other objects, features and attendant advantages of the present invention will be more fully appreciated as the same become better understood from the following detailed description when considered in connection with the accompanying drawings in which:

FIG. 4 is a longitudinal sectional view of another embodiment of the invention;

FIGS. 5 and 6 are diagrammatic views of a sequence for assembling the embodiment of the linear sensor shown in FIG. 4;

FIG. 7 is a longitudinal sectional view of another embodiment of a linear sensor in accordance with the present invention;

FIG. 8 is a longitudinal sectional view of an alternative slider configuration for use in the linear sensors of the present invention;

DETAILED DESCRIPTION OF PREFERRED EMBODIMENTS

Figure 1:
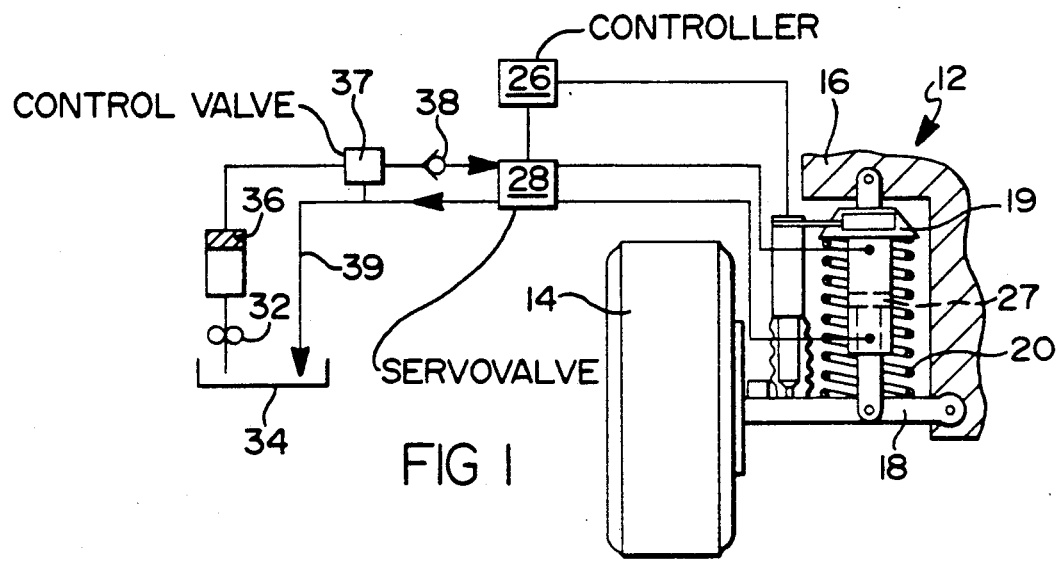
FIG. 1 is a diagrammatic view of a vehicle suspension system including the linear sensor of the present invention.

Referring now to FIG. 1, a linear sensor unit 10 is shown in association with a representatively illustrated vehicle suspension unit 12. The linear sensor unit 10 is provided to sense the space relationship between two movable parts.

More particularly, the vehicle suspension 12 has an unsprung mass represented by the vehicle wheel 14 and a sprung mass represented by the suspended vehicle body 16. A road arm 18 is pivoted at one end to the vehicle body 16. The road arm 18 carries the vehicle wheel 14 at the opposite end thereof. Between the road arm 18 and an upper spring seat 19 is located a coil spring 20 having one end thereof connected to the spring seat 19 and the opposite end thereof carried by the road arm 18. The coil spring 20 surrounds a double acting hydraulic actuator 22 which has its piston 24 pivotally connected to the road arm 18 such that the hydraulic actuator 22 and compression coil spring 20 act in parallel between the vehicle body 16 and the vehicle wheel 14. The position or displacement of the piston 24 is measured by the linear sensor 10. The linear sensor 10 directs signals to a known processor and controller 26 which in turn will produce programmed output signals to regulate the position of a servo valve 28 which is operatively connected to a hydraulic pressure system 30. The hydraulic pressure system supplies pressurized fluid to the hydraulic actuator 2 in accordance with the position of the servo valve 28. The servo valve 28 is controlled by signals from the processor and controller 26 to cause adjustment of the actuator piston to achieve a desired vehicle attitude.

Hydraulic pressure system 30 comprises a pump 32 receiving fluid from a reservoir 34 for supply under pressure through a filter 36 to control valve 37 either through a one-way valve 38 to the actuator 22 or to a bypass 37A to return line 39 back to the reservoir 34. The pressure system 30 is described in diagrammatic fashion to show what can be controlled by the linear sensor 10. Other power sources including pneumatic and oleopneumatic systems are equally suited for use with the invention.

While the linear sensor 10 is shown in association with a vehicle suspension system, it is equally suited for use with other operative environments wherein first and second members are moved with respect to one another and it is desirable to produce a linear output signal representing the relative displacement between the first and second members, e.g., linear sensors for detecting the position of aircraft control surfaces, boat stabilization systems and the like.

Figure 2:
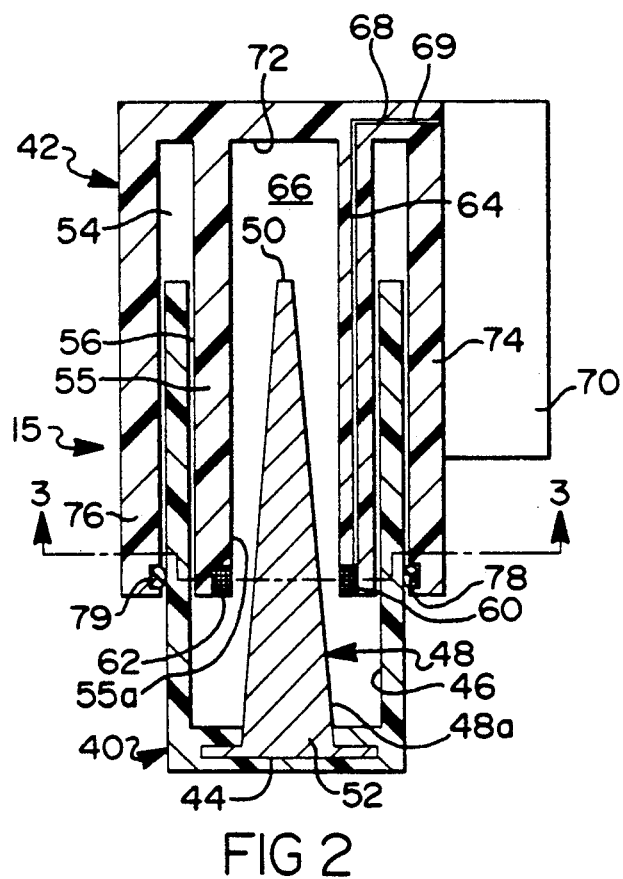
FIG. 2 is an enlarged sectional view taken along line 2—2 of FIG. 1 looking in the direction of the arrows.
Figure 3:
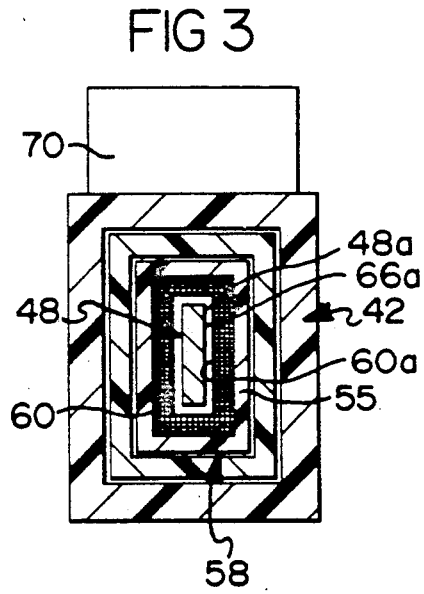
FIG. 3 is a cross-sectional view taken along the line 3—3 of FIG. 2 looking in the direction of the arrows.

FIGS. 2 and 3 of the present invention show the linear sensor 10 as having a slider unit 40 and a housing unit 42. The slider unit 40 is in the form of a hollow, open-ended rectangularly shaped plastic member having a base 44 and a rectangularly configured inner surface 46 located in surrounding relationship to a sensor element 48 of a suitable metallic material, e.g., ferromagnetic material or aluminum. The sensor element 48 has a variable area cross-section throughout the length thereof. The sensor element 48 also includes a free end 50 and a fixed end 52 that is connected to the base 44 of the slider unit 40. The slider unit 40 is adapted to be connected by suitable connecting means (not shown) to a movable member such as the control or road arm 18 of the vehicle suspension 12 shown in FIG. 1.

The slider unit 40 is telescopingly arranged in coaxial relationship with the housing unit 42. More particularly, the walls of the slider unit 40 are slideably received in a rectangular opening 54 formed throughout substantially the full height of the housing unit 42. The housing unit 42 includes a rectangularly configured inner wall 55 with an outer surface 56 that is located in spaced relationship to the rectangularly shaped inner surface 46 of the slider unit 40.

The surfaces 46, 56 define a sliding bearing 58 for supporting relative sliding movement between the slider unit 40 and the housing unit 42 during operation of the linear sensor 15.

In accordance with certain principles of the present invention, the bearing surfaces 46, 56 are located in spaced relationship to a doughnut shaped coil 60. Such spacing between the bearing surfaces 46, 56 and as shown in FIG. 2, coil 60 is carried in an axially open ended enables maximum signal strength from the coil 60 at each position of the sensor element 48. Coil 60 is carried in an annular groove 62 at the free end 64 of the rectangular wall 55. The groove 62 opens through the inner surface 55a of wall 55. A hollow cavity 66 is provided in the housing unit 42 in which the sensor element 48 reciprocates during operation of linear sensor 10. As shown in FIG. 3, the cavity 66 includes an open air gap 66a formed between the outer surface 48a of the sensor element 48 and an inner surface 60a of the coil 60 which is directly exposed to the hollow cavity 66. The width of the air gap 66a varies directly in accordance with the position of the sensor element 48 within the hollow cavity.

Depending upon the cross-section of the sensor element 48, a signal of varying magnitude will be produced from the coil 60, which is directed across leads 68, 69 to a control housing 70 mounted on the side of housing unit 42. The housing 70 supports known control components for processing the signal from the coil 60.

The sensor element 48 is metallic and will vary the eddy current pattern in the coil 60 (and the resultant inductance of the coil) in accordance with the spacing between the sensor element 48 and the coil 60. If the shape of the sensor element 48 is properly tailored with respect to the doughnut shaped coil 60, a linear current signal will be directed to the control component within the housing 70 to produce an output signal which varies linearly with respect to the movement of the sensor element 48 with respect to the coil 60. Such signal can then be used to control a signal responsive device, e.g., a servovalve, for maintaining a desired relationship such as programmed height in a vehicle suspension system.

The changes in the eddy current patterns within the coil 60 are attributable to the configuration of the outer surface area of the sensor element 48 as it reciprocates with respect to the coil. During reciprocation, the linear sensor 10 is fully supported for movement between a fully extended position at which the free end 50 of the sensor element 48 is located in proximity to the coil 60 or into a fully compressed or retracted position wherein the free tip 50 is located closely adjacent the end wall 72 of the housing 42.

Another problem with linear sensor arrangements is providing a sealed housing configuration which will have lateral stability as well as a fully sealed interior between the fully extended and fully retracted positions thereof. In the past, a protective boot has been provided between the inner housing and the slider element. Such protective boots do not provide lateral stability and are often made of a flexible thin wall material that is susceptible to failure. Accordingly, in the present invention, the housing unit 42 includes a rigid rectangular outer wall 74 which surrounds the slider unit 40 and the rectangular wall 55. The rectangular wall 74 is sealed to the end wall 72 of the housing 42. The outer wall 74 includes a free end 76 having an annular groove 78 therein in which is received an annular seal element 79 that is located in sliding, sealing engagement with the outer rectangular surface 40a of the slider unit 40 between the fully extended and fully compressed positions of the linear sensor 10.

Referring now to FIG. 4, another embodiment of the invention is illustrated as a linear sensor 80 having a slider unit 82, an inner housing 84 and an outer housing 86. The inner housing 84 has a coil 90 of a doughnut configuration supported in the free end 84a thereof, as in the case of the first embodiment. A pair of circular bearing surfaces 92, 94 are formed on the outside of the inner housing 84 and on the inside of the slider element 82, respectively, to form a sliding bearing for laterally supporting reciprocation of the slider unit 82. Such lateral support maintains concentricity between a tapered, ferromagnetic sensor element 82a on the slider unit 82 and the coil 90 during movement of the linear sensor 80 between fully compressed and fully extended positions.

In the embodiment of FIG. 4, the outer housing 86 has a plurality of diametrically located, equidistantly spaced, guide grooves 96 therein which receive tabs 98 on the upper end of the slider unit 82 to prevent relative rotation between the slider unit 82 and the outer housing 86. The upper end of the outer housing is secured by a clamp ring 100 to a mounting ring 101 on the inner housing 84 so as to secure the upper end 102 of the outer housing 86 thereto. The openings formed at the upper end of each of the guide grooves 96 are filled with a suitable sealant plug 104 for preventing the entry of dirt, moisture and the like interiorly of the linear sensor 80 at the upper end thereof. As in the case of the embodiment in FIGS. 1 and 2, the outer housing 86 carries a annular seal 106 to slideably, sealingly engage the outer surface 108 of the slider unit 82 to seal the opposite end of the sensor element 80 during reciprocation thereof between the fully extended and fully compressed positions.

In accordance with another aspect of the present invention, FIGS. 5 and 6 diagrammatically show a method for assembling the linear sensor 80. It is assembled by an improved method that includes the steps of locating the slider unit 82 coaxially of the inner housing 84 and sliding it in a bearing supported relationship on the bearing surfaces 92, 94 into a compressed position as shown in FIG. 5. The outer housing 86 is then telescoped over the slider unit 42 as shown in FIG. 6.

Thereafter, the clamp ring 100 is pressed against the outer surface of the mounting ring 101 to cause he outer housing 86 to be held in interlocked engagement with the inner housing 84. Thereafter, a suitable sealant is directed into the upper end of the joined outer housing 86 and inner housing 84 to fill the opening 96a at the upper end of each groove 96 above the tabs 98 therein. Alternatively, instead of filling the openings with a sealant such as epoxy material, the units can have a plate welded thereto to provide a suitable top seal.

FIG. 7 shows another embodiment of a linear sensor 110 configured like the previous embodiments, but including a slider unit 112 having a sensor element 114 with a tapered outer surface 116 and including a cross-head 118 at the free end of the sensor element 114. The cross-head 118 has a cross-section corresponding to the cross-section of the inner surface 120a of the inner housing 120 so to provide improved guidance of the reciprocating members and also improved lateral stiffness at full extension. As in the other embodiments, inner housing 120 has a free end which carries a coil 121 that interacts with the sensor element 14 to provide variances in eddy current (and coil inductance) to produce a desired maximum strength output signal from the linear sensor 110. Suitable mounting fixtures 112a and 120b are provided on the end of slider unit 112 and the inner housing 120, respectively.

Still another embodiment of the present invention is set forth in FIG. 8 as including a slider unit 122 suitable for us in the linear sensors of the previous embodiments. In this embodiment, the slider unit 122 has a sensor element 124 of an inverted conical configuration. It includes an enlarged head 126 with rounded-off corners 126a that prevent gouging of the sensor element in the inner surfaces of the inner housing or the coil as it moves with respect thereof. A fixed end 128 of the sensor element 124 tapers to a small point which is bonded to a center core extension 122a of the slider unit 122.

A further feature of the present invention is shown in the embodiment of FIG. 7. In this embodiment, the sensor element 114 has a molded plastic core 114a covered by a metal coating 114b applied thereon by suitable means such as vacuum metallizing sputter process or by gluing a conical metal member over the plastic core 114a.

Still another feature of the present invention is shown in the embodiment of FIG. 8. In order to stiffen the slider 122, an outer wall 122b is comprised of an inner fabric woven core 122c impregnated with a layer 122d of resin material. The resultant structure is reinforced by the fiber woven core 122c to provide lateral stiffness in the slider. Suitable fibers include woven glass, carbon filaments, high strength plastic fibers such as Kevlar.

Figure 9:
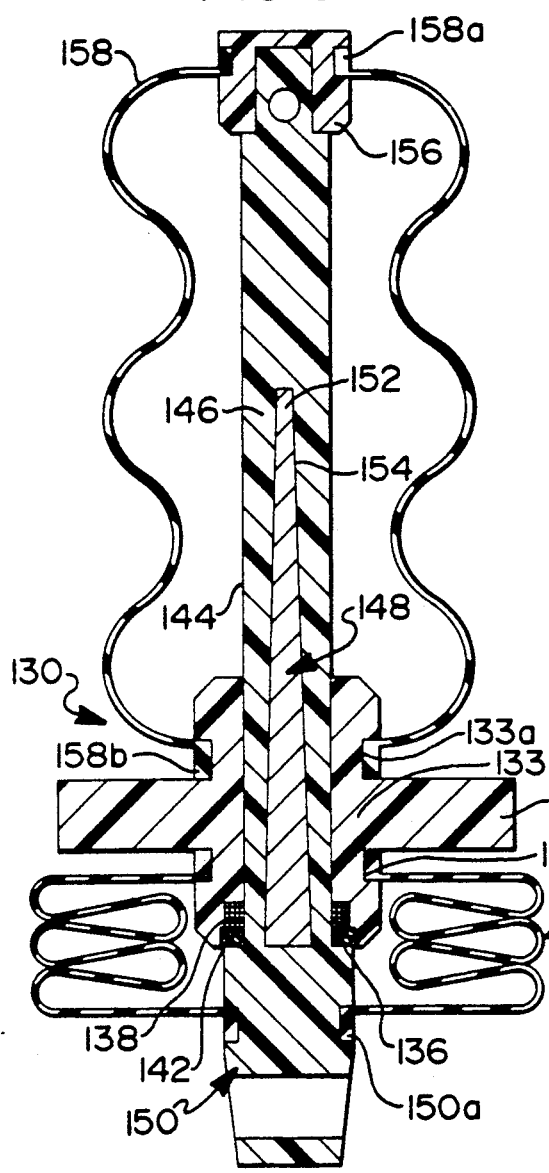
FIG. 9 is a longitudinal sectional view of another embodiment of the invention shown in a fully compressed position.
Figure 10:
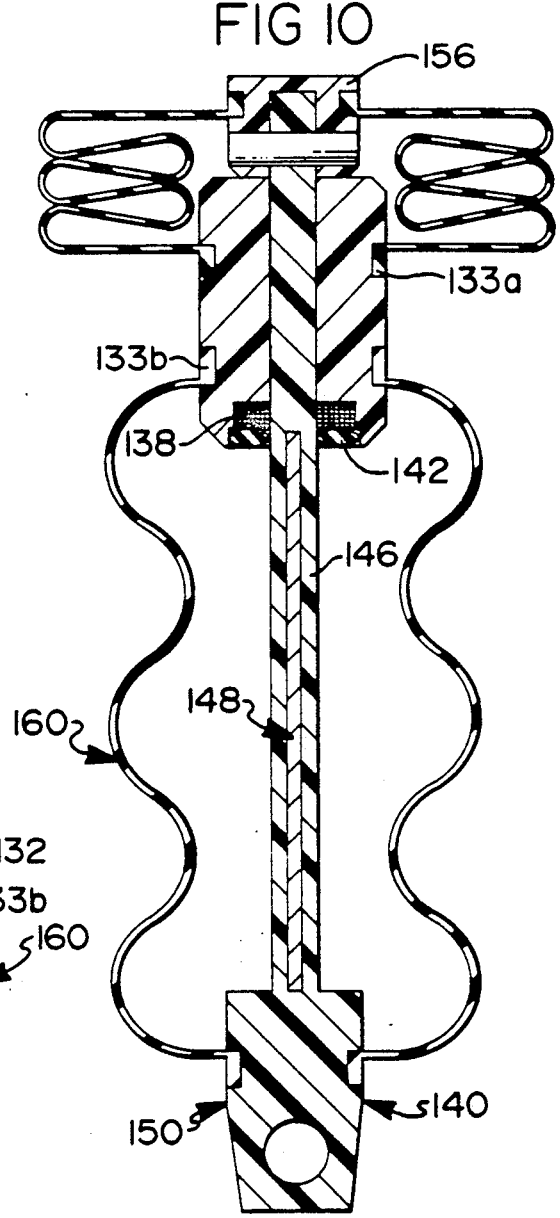
FIG. 10 is a longitudinal sectional view showing the linear sensor embodiment of FIG. 9 in a fully extended position.

Still another embodiment of the present invention is shown in FIGS. 9 and 10 as a linear sensor 130. It includes a trunnion 132 adapted to be attached to a vehicle frame or body. The trunnion 132 is attached to a housing 133 with a bore 134 formed therein open at opposite ends. The bore 134 has an enlarged diameter segment 136 at the lower end thereof in which is located a doughnut shaped sensing coil 138. A slider unit 140 is directed through the bore 134 and is movable with respect to the sensing coil 138 to change its inductance. A seal element 142 is located at the base of the bore 134 to seal the outer surface 144 of a molded plastic rod 146 of the slider unit 140. The slider unit 140 also includes a conically configured aluminum insert 148. An attachment fitting 150 is molded on one end thereof. The insert 148 has a free end 152 that is located part way up the length of the molded plastic rod 146 which encases a tapered outer surface 154 of the aluminum insert 148. The upper end of the molded plastic rod 146 has a fitting 156 thereon which is adapted to be connected to one end 158a of outer sealing boot 158 having the opposite end 158b thereof sealed with respect to an attachment groove 133a on the end of the housing 133. Likewise, a second outer sealing boot 160 is connected between a sealing groove 133b of the housing 133 and an attachment groove 150a in the fitting 150 as shown in FIG. 9. Each of the boots 158 and 160 has a bellows configured thin flexible wall which contracts and expands as the linear sensor moves between its full compression position (FIG. 9) and its full extension position (FIG. 10).

The housing 133 represents a first relatively movable member of the linear sensor 130 and the second relatively movable member is the slider unit 140 including molded plastic rod 144 and aluminum insert 148 encased therein. The slider unit 140 is slideably supported with respect to the bearing surface defined by the bore 13 through the housing 133.

In this arrangement, the variance in eddy current produced within the doughnut shaped coil 138 produce an output signal across leads 138a, 138b directed to a suitable electronics package of the type previously described for processing the signal to indicate changes in the relative height position of a device or the relative operative spacing of component parts of an operative device.

In the illustrated arrangement, the slider unit 140 is adapted to be attached to a moving lower suspension arm of a suspension system as shown in FIG. 1. The attachment can be a simple ball and socket joint or some other attachment means attached with respect to the fitting 150 on the end of the aluminum insert 148.

The housing 133 is adapted to be attached to the vehicle body or frame by the trunnion 132 and attachment means such as screws, clips or other alternative arrangements.

As the vehicle body and lower suspension arm move through their travels, the plastic rod 144 slides through the housing bore 134. The suspension height is sensed by the position of the tapered outer surface 154 of the aluminum insert 148 with respect to the doughnut shaped sensing coil 138.

It will be understood that the aforesaid description sets forth various linear sensor arrangements capable of continuously sensing the changes of the height or distance relationship between operative parts, for example, the sprung and unsprung masses of a vehicle suspension system.

The arrangement is obtained by a minimum of parts which are easily assembled. In certain of the embodiments an outer housing is provided for improved lateral stability at the extreme extended positions of movement therein.

Obviously numerous modifications and variations of the present invention are possible in light of the above teachings. It is, therefore, to be understood that within the scope of the appended claims, the invention may be practiced otherwise than as specifically described herein.

What is claimed is:

1. A height sensor for producing a linear current signal upon movement between first and second relatively moveable members having a coil carried by one of the relatively moveable members adapted to be connected to control means for processing the linear current signal and wherein the other of the relatively moveable members carrying a sensor element moveable relative to the coil to change the inductance therein in accordance with changes in the position of the sensor element during movement of said first and second relatively moveable members between fully retracted and fully extended positions thereof characterized by:
   said sensor element having an outer surface of varying dimension, a free end and a fixed end connected to said other of said first and second relatively moveable members;
   said one of said relatively moveable members having a terminal end with an axially open ended annular groove extending through said inner surface of said one of said relatively moveable members for directly exposing the windings of said coil;
   said sensing coil formed as a doughnut shaped ring having an exposed inner surface;
   said outer surface of said sensor element and said inner surface of said ring forming an air gap therebetween which varies in width in accordance with the relative movement between said relatively moveable members; and
   said sensing coil being position by said terminal end at said fixed end of said sensor element when said first and second moveable members are in their fully retracted position.

2. The linear sensor of claim 1 further characterized by said first and second relatively movable members being hollow members of rectangular cross-section and said second relatively movable member having a sensor element thereon of rectangular cross-section.

3. The linear sensor of claim 1 further characterized by said relatively movable members being open ended members telescoped together to form an enclosure having opposite ends.

4. The linear sensor of claim 3 further characterized by including means located in surrounding relationship with said open ended members for sealing said enclosure at both ends thereof.

5. The linear sensor of claim 1 characterized by;
   a rigid outer housing having a closed end and an open end;
   means for sealingly and fixedly connecting said closed end to one of said first and second relatively movable members for sealing said rigid outer housing member against entry of foreign matter at one end thereof; and
   means for slideably sealing the open end of said rigid outer housing to the other of said first and second relatively movable members for sealing said rigid outer housing against entry of foreign matter at the other end thereof;
   said rigid outer housing including means for laterally reinforcing said first and second relatively movable members in their fully extended position.

6. The linear sensor of claim 1, characterized by said first and second relatively movable members being hollow cylindrical telescoped members; bearing surfaces on said telescoped members for providing a sliding bearing support; said bearing surfaces having a length equal to that of each of said telescoping members and a length substantially equal to said sensor when in its fully retracted position and supporting said telescoped members for relative movement therebetween at and between the fully extended and fully retracted positions thereof; said bearing surfaces spaced outboard of said sensing coil whereby the signal from said sensing coil is maximized as said sensor element moves relative thereto.

7. The linear sensor of claim 1 further characterized by said first relatively movable member including means forming a housing for a control circuit for receiving the variable signal from said coil.

8. The linear sensor of claim 5 further characterized by said rigid outer housing and said other of said first and second relatively movable members having coacting means thereon to prevent relative rotation therebetween and to prevent separation of said rigid outer housing from said other of said first and second relatively movable members in the fully extended position.

9. The linear sensor of claim 8 characterized by said coacting means including tabs on said hollow rigid member and grooves on said other of said first and second members slideably receiving said tabs.

10. The linear sensor of claim 1 further characterized by said sensor element having a tapered outer surface thereon.

11. The linear sensor of claim 1 further characterized by said sensor element having a tapered outer surface and means forming a plastic rod around said sensor element coacting with one of said relatively moveable members for providing a sliding bearing support therebetween.

12. The linear sensor of claim 1 further characterized by said sensor element having either a plastic core with a metal cover or a metal core with a plastic cover.

13. The linear sensor of claim 1 further characterized by said sensor element being formed of plastic and formed integrally of said second relatively movable member; and a metal coating on the outer surface of said sensor element.

14. The linear sensor of claim 1 further characterized by said second relatively movable member being formed from plastic impregnated woven fibers.

15. A height sensor for producing a linear current signal upon movement between first and second relatively moveable members having a coil carried by one of the relatively moveable members adapted to be connected to control means for processing the linear current signal and wherein the other of the relatively moveable members carrying a sensor element moveable relative to the coil to change the inductance therein in accordance with changes in the position of the sensor element during movement of said first and second relatively moveable members between fully retracted and fully extended positions thereof characterized by:

each of said first and second relatively movable members being constructed of plastic material having an inner surface and an outer surface;

said sensor element having an outer surface of varying dimension, a free end and a fixed end connected to said other of said first and second relatively moveable members;

said one of said relatively moveable members having a terminal end with an axially open ended annular groove extending through said inner surface of said one of said relatively moveable members for directly exposing the windings of said coil;

said sensing coil formed as a doughnut shaped ring having an inner surface;

said outer surface of said sensor element and said inner surface of said ring forming an open air gap therebetween which varies in width in accordance with the relative movement between said relatively moveable members; and said outer surface of said one of said relatively moveable members and said inner surface of said other of said relatively moveable members providing a full bearing support along their length against lateral movement between said first and second relatively moveable members during movement of said first and second relatively moveable members between their fully retracted and fully extended positions while maintaining said open air gap between said sensing coil and said sensor element.

* * * * *